United States Patent [19]
Jones

[11] 3,843,208
[45] Oct. 22, 1974

[54] ACCELERATION AND DECELERATION DIFFERENTIATOR CIRCUITS FOR A VEHICLE SKID CONTROL BRAKING SYSTEM

[75] Inventor: James J. Jones, Plane, Tex.

[73] Assignee: Texas Instruments Incorporated, Dallas, Tex.

[22] Filed: July 3, 1972

[21] Appl. No.: 268,401

[52] U.S. Cl............ 303/21 R, 188/181 A, 235/183, 303/20, 328/127
[51] Int. Cl............................................... B60t 8/12
[58] Field of Search.............. 188/181 A; 235/183; 303/20, 21; 328/114, 115, 127, 168, 175, 324/162, 340/52 R, 53, 262

[56] References Cited
UNITED STATES PATENTS
3,554,612   1/1971   Harned ............................ 303/20 X
3,717,384   2/1973   Harned ............................ 303/20 X

*Primary Examiner*—Trygve M. Blix
*Assistant Examiner*—Stephen G. Kunin
*Attorney, Agent, or Firm*—Harold Levine; James T. Comfort; William E. Hiller

[57] ABSTRACT

Disclosed are Acceleration and Deceleration Differentiator circuits utilized in a Vehicle Skid Control Braking system. The disclosed circuit includes a first signal generator responsive to a first signal representing the wheel speed of the vehicle for generating second signals representing rate of change of the vehicle wheel speed. This circuit also includes a second signal generator responsive to the second signals for selectively controlling the first signal generator when the second signals reach a first selected value representing a preselected rate of change of the wheel speed.

14 Claims, 5 Drawing Figures

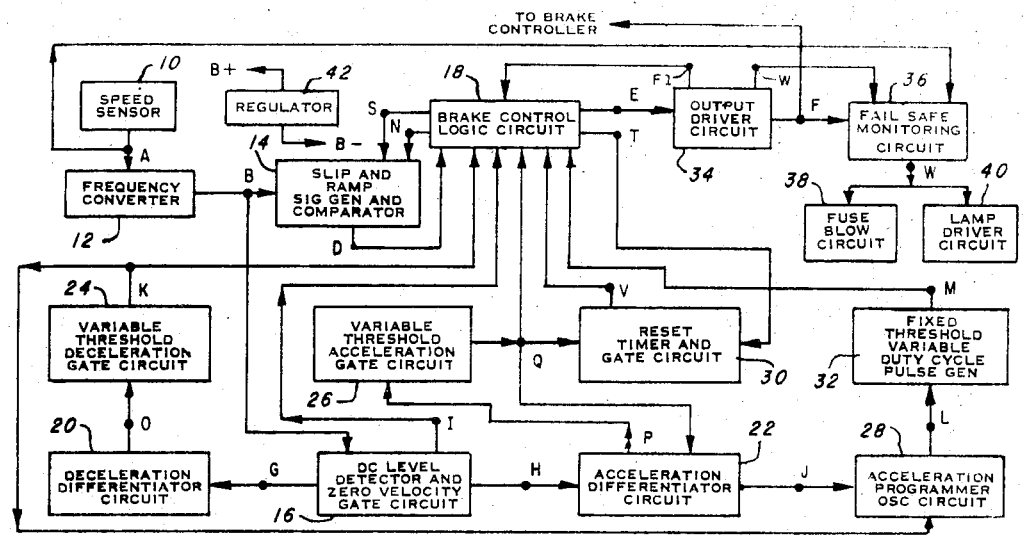
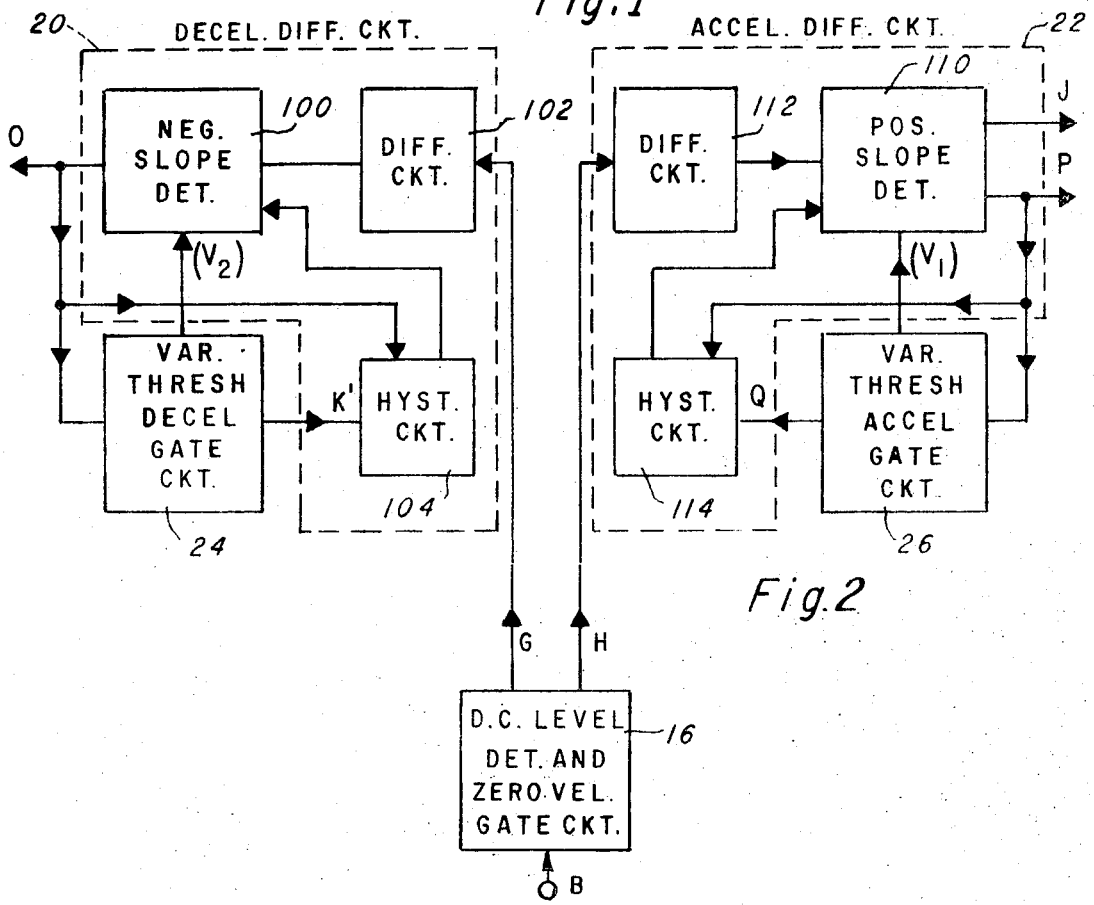
Fig.1
Fig.2

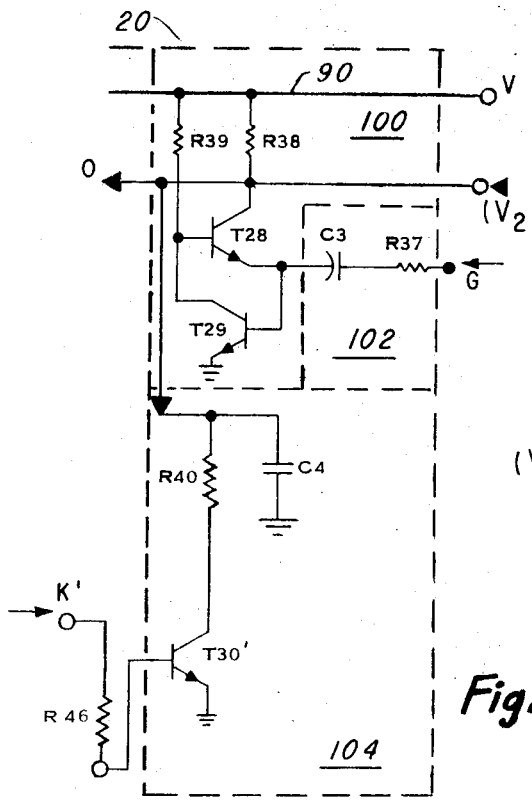
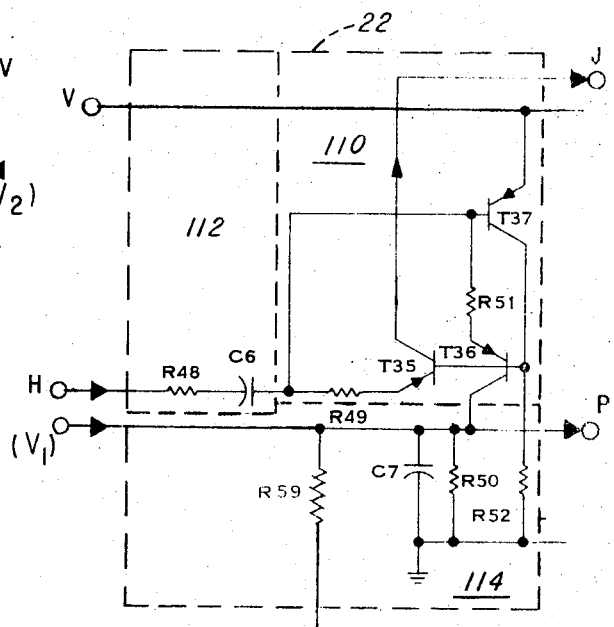
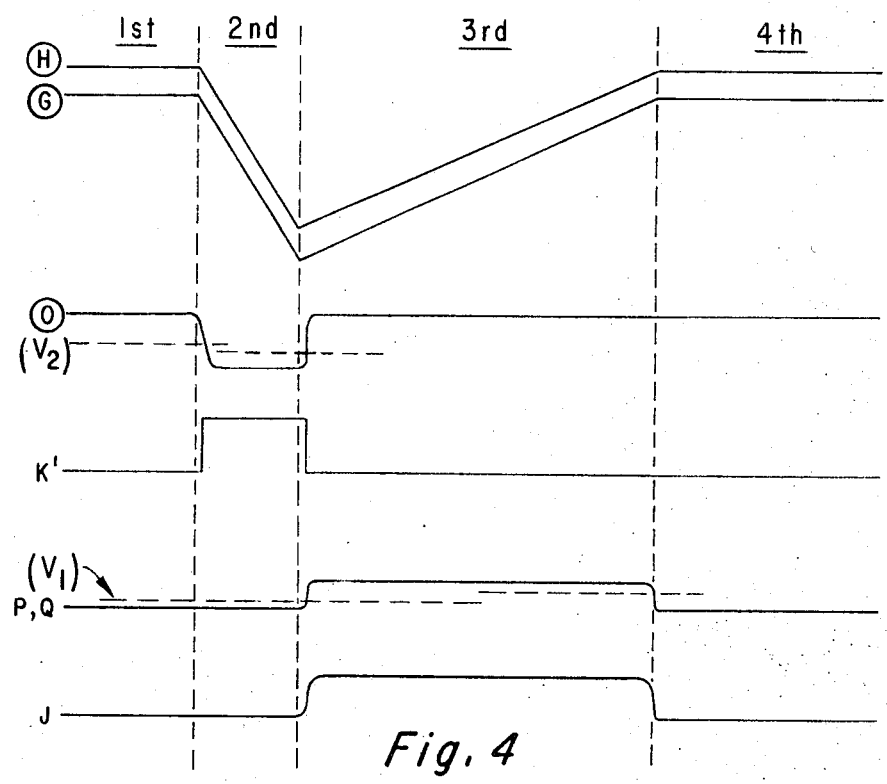
Fig. 3a
Fig. 3b
Fig. 4

ACCELERATION AND DECELERATION DIFFERENTIATOR CIRCUITS FOR A VEHICLE SKID CONTROL BRAKING SYSTEM

BACKGROUND INFORMATION

This invention relates to a vehicle skid control system, and more particularly to a "pumping-type" or "pulse action" vehicle brake control system that advantageously utilizes in combination: (1) Speed Sensor means; (2) Frequency Convertor means; (3) Slip and Ramp Signal Generator and Comparator Circuit means; (4) D.C. Level Detector and Zero Velocity Gate circuit means; (5) Acceleration and Deceleration Differentiator circuit means; (6) Variable Threshold Acceleration and Deceleration Gate Circuit means; (7) Acceleration programmed Oscillator circuit means; (8) Fixed Threshold Variable Duty Cycle Pulse Generator circuit means; (9) Reset Timer and Gate Circuit means; (10) Brake Control Logic circuit means; and (11) Failsafe Monitoring and Indicating means.

When the operator of a land vehicle desires to stop his vehicle under emergency braking conditions or under adverse road conditions, a realistic probability exists that the land vehicle will undergo an uncontrolled skid, or a controllable skid which prevents the operator from bringing his land vehicle to a safe stop within the distance available. Under these circumstances, one factor that indicates an imminent skid is the relative relationship between vehicle wheel speed and vehicle speed. It has been readily accepted by safety experts and professional land vehicle drivers that vehicle stability can be achieved by automatically pumping or pulsing of the brakes associated with the wheels of the land vehicle in a pre-programmed manner dynamically related to the rate of acceleration and deceleration of the land vehicle.

In more recent times, several systems have been developed that operate on the principle of selectively inhibiting the normal braking action initiated by the operator of the land vehicle. In one of these systems, wheel speed sensors are utilized to generate AC signals that are proportional to vehicle wheel speed. The vehicle wheel speed signals are then processed through a control module which generates a DC voltage to energize a solenoid in an actuator that controls the hydraulic braking system to the vehicle wheels. When a skid is imminent, a command signal from the control module causes the actuator solenoid to close a vacuum passage in a diaphragm chamber. By action of the diaphragm and the normal hydraulic pressure from the master cylinder of the land vehicle braking system as developed by the operator thereof, the hydraulic pressure to the vehicle wheels is released, thereby inhibiting the vehicle wheel braking action. When the vehicle wheels spin up to the vehicle speed or to a selective lower speed, the control module produces a signal to deenergize the actuator solenoid. This in turn restores line pressure in the vehicle braking system and reapplies the vehicle brakes. In effect, what is achieved by this system is that the vehicle brakes are pumped or pulsed in a manner often recommended for controlled braking under adverse driving conditions.

The control module of the aforementioned system includes a frequency convertor for each wheel speed sensor for converting a frequency varying signal into a varying direct current signal proportional thereto. A summation of the outputs from each of the frequency convertors produces a composite of the vehicle wheel speed signals. Respective deceleration and acceleration rate detectors respond to the output of the summing amplifier for producing outputs proportional to the rate of deceleration and acceleration respectively of the wheels of the land vehicle. A signal proportional to the output of the summing amplifier is transferred to a vehicle velocity ramp generator and one input of an automatically adjustable switching circuit. The vehicle velocity ramp generator produces a step function ramp signal having an overall slope related to the actual speed of the land vehicle when braking to a stop. The automatically adjustable switching circuit also receives an input from the vehicle velocity ramp generator and an input from a retarding force detector, and produces an output whenever the summation of the wheel speed signal, the velocity ramp signal, and the retarding force signal reaches a first threshold condition. The reatrding force detector produces an output signal which relates to the braking factors including tire condition, brake condition, and the condition of the road surface. To generate a control signal to the actuator solenoid, the output of the deceleration rate detector, the acceleration rate detector, and the automatically adjustable switching circuit must have a certain designated relationship. These three signals are the inputs to the brake controller as the last component in the control module.

A more detailed description of the features briefly stated above with regard to a prior known vehicle skid control system is set forth in a copending patent application, Ser. No. 25,131, filed Apr. 2, 1970, for "VEHICLE SKID CONTROL SYSTEM," which is assigned to the assignee of this application.

Another known and similar system that operates on the principle of inhibiting the normal braking action initiated by the operator of the land vehicle is set forth in U.S. Pat. No. 3,578,819, issued May 8, 1971, for "SKID CONTROL SYSTEM," in the name of Thomas M. Atkins.

OBJECTIVES OF THE INVENTION

An object of the present invention is to provide a differentiator circuit which provides as an output signal the mathematical derivative, i.e., rate of change, of an input signal.

Another object of this invention is to provide a differentiator circuit which generates the mathematical derivative of an input signal and selectively alters the magnitude of the derived signal to decrease switching time and provide a quick responsive output signal from the varying input signal.

It is yet another object of the present invention to provide in a Vehicle Skid Control Braking system a differentiator circuit which generates from an input signal representing wheel speed of the vehicle an output signal representing either acceleration or deceleration conditions of the wheels of the vehicle.

It is still a further object of the present invention to provide first and second differentiator circuits in a Vehicle Skid Control Braking system which generate from a signal representing wheel speed of the vehicle output signals representing acceleration and deceleration conditions respectively of the wheels of the vehicle.

It is still another object of the present invention to provide in a Vehicle Skid Control Braking system of the type that selectively controls engagement and disengagement of the braking system of a vehicle in accordance with selected braking conditions, a differentiator circuit comprising first signal means responsive to a first condition of a first signal representing the wheel speed of the vehicle for generating an output signal representing acceleration or deceleration conditions of the wheels of the vehicle, and second signal means responsive to the output signal for selectively biasing said first signal means to indicate when the output signal reaches a first selected value representing a preselected rate of acceleration or deceleration of the wheels.

It is still another object of the present invention to provide a differential circuit comprising first signal means responsive to a negative rate of change of a first signal representing the wheel speed of the vehicle for generating a second signal representing deceleration conditions of the wheels; second signal means responsive to the second signal for selectively biasing the first signal means to indicate when the second signal reaches a first selected value representing a preselected rate of deceleration of the wheels; third signal means responsive to the positive rate of change of a third signal representing the wheel speed of the vehicle for generating a fourth signal representing acceleration conditions of the wheels; and fourth signal means responsive to the third signal means for selectively biasing the third signal means to indicate when the fourth signal reaches a second selected value representing a preselected rate of acceleration of the wheels.

BRIEF DESCRIPTION OF THE DRAWINGS

FIG. 1 is a block diagram of one embodiment of an improved Vehicle Skid Control Module for a Vehicle Skid Control Braking system;

FIG. 2 is a block diagram of a deceleration differentiator circuit and an acceleration differentiator circuit coupling a DC Level Detector and Zero Velocity Gate circuit to a Variable Threshold Deceleration Gate circuit and a Variable Threshold Acceleration Gate circuit respectively in the Skid Control Module of FIG. 1;

FIGS. 3a–3b represent circuit schematic of the Deceleration Differentiator circuit and Acceleration Differentiator circuit depicted in block form in FIG. 2; and FIG. 4 graphically represents exemplary input waveforms and the output waveforms generated as a result thereof in the Deceleration Differentiator circuit and the Acceleration Differentiator circuit depicted in FIGS. 3a–3b.

BRIEF DESCRIPTION OF THE INVENTION

An improved Vehicle Skid Control System in which this invention is advantageously utilized includes a wheel sensor, which may be coupled to the wheels or to the drive shaft of the land vehicle, generates AC signals having a frequency varying in accordance with vehicle wheel speed A. These frequency varying signals A are coupled to a Frequency Convertor that produces a DC output signal having a voltage magnitude that varies proportionally with the frequency of the AC signals generated by the speed sensor B. The varying DC wheel speed signals B generated by the frequency convertor are coupled to a Slip and Ramp Signal Generator and Comparator and to a DC Level Detector and Zero Velocity Gate circuit.

The Slip and Ramp Signal Generator and Comparator performs three basic functions: First, it modifies or offsets the varying DC wheel speed signals B coupled thereto by a predetermined percentage or value, which is referred to as the slip signal $C_1$; second, under the control of the slip signal $C_1$, it generates a ramp signal C having a programmable constant current rate of discharge; and third, it compares the ramp signal C and the varying DC signal B, and when vehicle wheel speed drops below the related vehicle speed represented by ramp signal, it generates a slip gate signal D. The slip gate signal D is then coupled to one of the inputs of a Brake Control Logic circuit.

The DC Level Detector and Zero Velocity Gate circuit performs three basic functions: First, it generates two DC level signals (G and H) when the frequency of the AC signal A is zero or below a preset value with respect to vehicle wheel speed; second, it generates a zero velocity gate signal (I) when the DC level signal B reaches a selected DC level; and third, it prevents any ripple characteristics of the varying DC signal B coupled thereto, which frequently occur when the land vehicle is operated at low speeds, from being coupled into a Deceleration Differentiator circuit and to an Acceleration Differentiator circuit. The two DC level signals are coupled respectively to the Deceleration and Acceleration Differentiator circuits, while the zero velocity gate signal I is coupled to the Brake Control Logic circuit.

The Deceleration Differentiator circuit of this invention differentiates the DC level signal G coupled thereto, and couples a deceleration differentiator signal (0) to a Variable Threshold Deceleration Gate circuit, which in turn generates a deceleration gate signal (K) when the rate of deceleration of the vehicle wheels exceeds a preset value.

The Variable Threshold Deceleration Gate circuit has a variable threshold feature which produces an output gate signal having a "turn on" threshold at a different level than its "turn off" threshold. That is to say, the Variable Threshold Deceleration Gate circuit turns on at a lower threshold than it turns off so as to provide a desirable fast turn off relative to the rate of deceleration of the vehicle wheels. The Variable Threshold Deceleration Gate circuit output gate signal is then coupled to the Brake Control Logic circuit.

The Acceleration Differentiator circuit of this invention is similar to the Deceleration Differentiator circuit but for the fact that it operates in response to the rate of acceleration of the vehicle wheels. This circuit differentiates the DC level signal H coupled thereto and couples a first acceleration differentiator signal (J) to an Acceleration Programmed Oscillator circuit, and couples a second acceleration differentiator signal (P) to a Variable Threshold Acceleration Gate circuit.

The Variable Threshold Acceleration Gate circuit is also similar to the Variable Threshold Deceleration Gate circuit but for the fact that it is responsive to the rate of acceleration of the vehicle wheels. This circuit also has a variable threshold feature wherein the turn on threshold of the circuit is at a lower value than the turn off threshold of the circuit. The acceleration gate signal (Q) is coupled to the Brake Control Logic circuit and to a Reset Timer and Gate circuit.

The Acceleration Programmed Oscillator circuit in response to the acceleration differentiator signal J produces an acceleration oscillator signal (L) that has a frequency proportional to the rate of acceleration of the vehicle wheels. This acceleration oscillator signal, L is then coupled to a Fixed Threshold Variable Duty Cycle Pulse Generator.

The Fixed Threshold Variable Duty Cycle Pulse Generator can be programmed from zero percent to 100 percent duty cycle with respect to the output signal. This circuit produces a duty cycle gate signal (M) and couples this duty cycle gate signal M to the Brake Control Logic circuit.

The Reset Timer and Gate circuit receives input signals from both the Brake Control Logic circuit (T) and from the Variable Threshold Acceleration Gate circuit (Q) and commences a reset timing cycle at the end of the reset time period which develops a reset gate signal (V) for selectively coupling the acceleration gate signal Q to the Brake Control Logic circuit.

Fundamentally, the Slip and Ramp Signal Generator and Comparator develops a slip signal D, which is a turn on gate signal for controlling the brake system of the land vehicle in dynamic proportion to the conditions developed by the Zero Velocity Gate circuit, and the Variable Threshold Acceleration and Deceleration Gate circuits. On the other hand, the brake system of the land vehicle is also controlled by the Reset Gate circuit. Thus, the brake system of the land vehicle is controlled, i.e., turned on or turned off, dependent relative upon wheel speed acceleration rates and wheel velocity levels.

The Brake Control Logic circuit in response to the presence of the several input gate signals applied thereto (i.e., slip gate D, zero velocity gate I, decel gate K, duty cycle gate M, accel gate Q and reset gate V) develops output signals (E, N, S, and T) which are respectively applied to the Output Driver circuit, to turn on or turn off the brake system of the land vehicle; to the Slip and Ramp Signal Generator, to set the slip and ramp signal generator and comparator and produce the slip gate signal D; and to the Reset Timer and Gate circuit; to reset the skid control module for the succeeding cycle of operation.

The variable AC output signal A generated by the Speed Sensor is also coupled to a Failsafe Monitoring circuit wherein various module, vehicle and vehicle braking conditions are monitored for the purpose of either developing a visual or audible malfunction indication or for blowing a fuse or actuating a circuit breaker as a result of module malfunction, or both. The visual or audible indication feature is for alerting the operator of the land vehicle that a module malfunction exists, while the fusing or circuit braking feature is to remove power from the module and prevent damage thereto. The Failsafe Monitoring circuit may observe many selected characteristics both internal or external to the module. For example, it may detect over-current conditions (Failsafe I) of the module and provide a visual or audible indication for the operator and also remove power from the module because this condition means that the land vehicle braking system is malfunctioning in a manner that can damage the module. The Failsafe Monitoring circuit may also generate a visual or audible indication when power to the module is cut-off (Failsafe II) but will not fuse or circuit break since this condition cannot damage the module. The Failsafe Monitoring circuit may also generate a visual or audible indication but not remove power from the module when the Speed Sensor line is open (Failsafe III) because this condition merely indicates that the skid control module is malfunctioning in a manner that will not damage the module. A visual or audible indication may be generated by the Failsafe Monitoring circuit when the brake system solenoid is open (Failsafe IV) but not fuse or break power since this condition will not damage the module.

Also, the Failsafe Monitoring circuit may generate visual and audible indications for the operator and remove power from the module when it senses a shorted output condition so as to protect the module from burning out. Monitoring the vehicles braking light switch determines false cycling conditions, when, for example, the operator is not applying the vehicle braking system. False cycling signals may be accumulated over a given finite period of time whereupon both an operator indication and power removing may occur to both indicate a module malfunction and protect the module from further damage. Other failsafe monitoring conditions can be incorporated into the module of this invention without departing from spirit of this invention.

A more detailed description of the above described improved Vehicle Skid Control System is set forth in copending patent application, Ser. No. 266,798, filed June 27, 1972.

A more complete understanding of the invention and its advantages will be apparent from the specification and claims and from the accompanying drawings illustrative of the invention.

Detailed description of preferred embodiments of this invention follows with reference being made to the drawings wherein like parts and elements have been given like reference numerals for clarity and understanding of the novel, useful and unobvious features of this invention.

DETAILED DESCRIPTION - FIG. 1

Referring to the drawings, in FIG. 1 there is illustrated in block diagram format the components of one embodiment of a control module in a vehicle skid control braking system including a Speed Sensor 10 and a Frequency Converter 12. The Speed Sensor 10 is coupled to either the wheels or to the drive shaft of a land vehicle, e.g., electromagnetically, optically or mechanically, and generates a varying AC signal (A) which has frequency variations proportional to wheel speed. That is to say, the faster the wheel speed, the higher the frequency of the signal A connected to the Frequency Converter 12. The variable AC signals A generated by the Speed Sensor 10 are coupled to the Frequency Converter 12 wherein they are converted to a varying DC signal (B) having a DC magnitude proportional to vehicle wheel speed. The varying DC signal B generated by the Frequency Converter 12 is coupled to both the Slip and Ramp signal Generator and Comparator 14 and the DC Level Detector and Zero Velocity Gate circuit 16.

The Slip and Ramp Signal Generator and Comparator 14 modifies or offsets the varying DC signal B a preselected value and produces a slip signal ($C_1$), and then under the control of the slip signal $C_1$, it develops a ramp signal (C) having a dynamically programmable constant current rate of discharge. The ramp signal C is then compared with the varying DC signal B, and when the wheel speed of the land vehicle drops below the related vehicle speed represented by the ramp signal C, a slip gate signal (D) is generated. The slip gate signal D is then coupled to one of the inputs of the Brake Control Logic circuit 18.

The DC Level Detector and Zero Velocity Gate circuit 16, in response to the variable DC signal B generated by the Frequency Converter 12, generates two output signals (G and H), each signal being clamped at a selected DC level of the input signal applied thereto, with such signals being respectively coupled to the Deceleration Differentiator circuit 20 and the Acceleration Differentiator circuit 22. Basically, the reason for detecting the preselected DC levels of the input signal B and developing output signals G and H, is to prevent any ripple characteristics of the signal applied thereto, which frequently occurs when the land vehicle is operated at low speeds, from being coupled into the Deceleration and Acceleration Differentiator circuits 20, 22. The DC Level Detector and Zero Velocity Gate circuit 16 develops a zero velocity gate signal (I) and couples this signal I to one input of the Brake Control Logic circuit 18.

The Deceleration Differentiator 20 differentiates the variable DC signal G applied thereto and generates a pulse output signal (O) which signal O is coupled to the Variable Threshold Deceleration Gate circuit 24; while the Acceleration Differentiator 22 differentiates the variable DC signal H applied thereto and generates a pulse output signal (P) which signal P is coupled to the Variable Threshold Acceleration Gate circuit 26.

The Variable Threshold Deceleration Gate circuit 24 has a variable threshold feature which produces an output gate signal (K) having a turn on threshold at a different level than its turn off threshold. That is to say, the Variable Threshold Deceleration Gate circuit 24 turns on at a lower threshold than it turns off so as to provide a desirable fast turn off of the vehicle braking application relative to the rate of deceleration of the wheels of the land vehicle. The pulse output signal K developed by the Variable Threshold Deceleration Gate circuit 24 is present when the deceleration rate of change of the vehicle wheels exceeds a preset value and is coupled to one of the inputs of the Brake Control Logic circuit 18 and to the Acceleration Programmed Oscillator circuit 28.

The Variable Threshold Acceleration Gate circuit 26 is similar to the Variable Threshold Deceleration Gate circuit 24 but for the fact that it is responsive to the pulse output signal P developed by the Acceleration Differentiator 22, and generates a pulse output signal (Q) indicative of acceleration of the vehicle wheel speed above a preselected value. The circuit also has a variable threshold feature in which the turn on of the circuit is at a lower threshold than the turn off feature of the circuit. The pulse output signal Q of the Variable Threshold Acceleration Gate circuit 26 is coupled to one of the inputs of the Brake Control Logic 18, the Acceleration Differentiator circuit 22 and the Reset Timer and Gate circuit 28.

The Acceleration Programmed Oscillator circuit 28 receives an analog signal (J) from the Acceleration Differentiator 22 which programs the oscillator so as to produce a sawtooth pulse output signal (L) that has a frequency proportional to the rate of acceleration of the vehicle wheels. This output sawtooth signal L is coupled to a Fixed Threshold Variable Duty Cycle Pulse Generator 32.

The Fixed Threshold Variable Duty Cycle Pulse Generator 32 is programmable from zero percent to 100 percent duty cycle with respect to the output signal developed thereby M. The output signal M of the Fixed Threshold Variable Duty Cycle Pulse Generator 32 is coupled to one of the inputs of the Brake Control Logic circuit 18.

The Reset Timer and Gate circuit 30 is reset by one of the outputs of the brake control logic circuit 18 (T) and commences a reset timing cycle at the end of the reset time period which develops a reset gate signal (V) for controlling the application of the output pulse signal Q generated by the Variable Threshold Acceleration Gate circuit 26 (Q) and selectively couples this output pulse signal Q to one of the inputs of the Brake Control Logic circuit 18.

In addition to the pulse output signal T, the Brake Control Logic circuit 18 also develops an output pulse (E) and couples the pulse signal E to the Output Driver circuit 34, which in turn develops output pulse signals (F and W). The output pulse signal F is coupled to the Brake Controller (not shown) of the land vehicle braking system and to the Failsafe Monitoring circuit 36. The output pulse signal W is coupled to the Failsafe Monitoring circuit 36. The output pulse signal F1 applied to the Brake Control Logic circuit 18 sets the logic circuit in condition for a subsequent brake control cycle of operation.

The Failsafe Monitoring circuit 36 also receives the variable AC signal A from the Speed Sensor 10, and along with the output pulse signals F and W, monitors module system operation and develops signals which either drive an indicator, such as a lamp or buzzer, or disconnect power to the module, i.e., blow a fuse or open a circuit breaker, or both, for visual or audible indication of module or braking system malfunction, or for disconnecting power from the module to prevent further damage, or both. The Failsafe Monitoring circuit 36 respectively couples control signals to the Fuse Blow circuit 38 and/or the Lamp Driver circuit 40.

DETAILED DESCRIPTION - FIG. 2

Referring now to FIG. 2, there is depicted in block diagram form the functional components of the acceleration and deceleration differentiator circuits disclosed in this Application. The circuit function embodied in FIG. 2 is particularly advantageous when utilized in the Vehicle Skid Control Braking system of FIG. 1. In such a braking system a varying DC signal B indicative of wheel speed is coupled to a DC Level Detector and Zero Velocity Gate circuit 16. The detector 16 generates a first varying DC signal H which is dependent upon the frequency of the input signal and accordingly dependent upon wheel velocity. Signal H is coupled to the Acceleration Differentiator Circuit 22 of this invention in the skid control system above. Output signal G from the detect0r 16 also is dependent upon wheel velocity and is coupled to the Deceleration Differentiator Circuit 20 of this invention in the skid control system above.

Signals H and G indicative of wheel speed respectively provide signals J and P, and generated by the differentiator circuits 22 and 20 to indicate wheel acceleration and deceleration in the Skid Control Braking system.

The Acceleration Differentiator circuit 22 comprises a differentiator circuit 112 for selectively differentiating the incoming signal H coupled to a positive slope detector 110 which generates output signals J and P when the signal H exhibits a positive rate of change to represent the rate of increase or acceleration of the varying DC signal H. Signal J may preferably be coupled to any current sensitive module, such as the Acceleration Programmer Oscillator circuit 28 in the Skid Control Braking system of FIG. 1. Output signal P is preferably coupled to a voltage sensitive circuit to indicate an acceleration condition of the wheels of the vehicle, such as the Variable Threshold Acceleration Gate circuit 26 of the Skid Control Braking system of FIG. 1. The Variable Threshold Gate circuit 26 supplies a first bias level $V_1$ to the acceleration differentiator circuit 22 which selectively functions as a threshold level. The differentiator circuit 22 further comprises a hysteresis circuit 114 which selectively biases the positive slope detector 110 when the threshold $V_1$ is reached. Threshold $V_1$ is representative of a first preselected rate of acceleration of the wheels.

When the acceleration output signal P reaches the threshold voltage $V_1$, the gate circuit 26 provides a signal Q to the hysteresis circuit 114 which provides the necessary bias to the detector 110. The bias supplied by hysteresis circuit 114 to the detector 110 causes output signal P to increase its rate of change, or otherwise, indicating that the level $V_1$ has been reached. Preferably, the magnitude of signal P is increased to provide an improved, faster, and highly responsive output signal in response to the varying input signal H. The indication that the predetermined rate of acceleration of the wheels of the vehicle has been reached is one crucial aspect of the anti-skid brake control system of FIG. 1.

The Deceleration Differentiator circuit 20 comprises a differentiating circuit 102 coupled to a negative slope detector 100 which is coupled to a hysteresis circuit 104. A second signal G from the DC Level Detector and Zero Velocity Gate circuit 16 is indicative of the wheel speed of the vehicle and typically is a varying DC signal. The differentiator circuit 102 selectively differentiates incoming signal G and couples the differentiated signal to a negative slope detector 100 which is responsive to a negative rate of change, i.e., rate of decrease, of the incoming signal G. For the condition that incoming signal G exhibits a negative rate of change, the detector 100 provides an output signal O which is the mathematical differential of incoming signal G, and represents a deceleration condition of the wheels of the vehicle. Coupled to the negative slope detector 100 is hysteresis circuit 104 which monitors the deceleration signal O to selectively bias the detector 100 when the signal O reaches a second selected level. Variable threshold deceleration gate circuit 24 selectively supplies the second selected level $V_2$, which functions as a threshold level to the signal O. Threshold $V_2$ is representative of a preselected rate of deceleration of the wheels of the vehicle. Upon the condition that the deceleration signal O reaches the threshold level $V_2$, the gate circuit 24 provides a gating signal K' to the hysteresis circuit 104, which then selectively biases the detector 100 to indicate that the threshold $V_2$ has been reached.

Upon receiving the bias signal from hysteresis circuit 104, the negative slope detector 100 indicates that threshold $V_2$ has been reached, preferably by increasing the rate of change of the output signal O, which typically clamps signal O to a low value. Such an indication of the acceleration signal O reaches the threshold $V_2$ and thereby indicating that the deceleration of the wheels has reached a preselected rate of deceleration, is one crucial aspect of the skid control braking system depicted in FIG. 1.

If incoming signal H exhibits a negative rate of change, indicative of deceleration conditions, then the positive slope detector 110 supplies as an output signal P a constant voltage output level which represents a no response condition to the signal H. Likewise, when signal G has a positive rate of increase, i.e., indicative of an acceleration condition of the wheels of the vehicle, the negative slope detector also provides an output signal O having a constant voltage level representing a no response condition to the signal G.

Threshold levels $V_1$ and $V_2$ are selectively provided such that $V_1$ establishes a first threshold value for one condition of signal P and a second threshold value for a second condition of signal P. Likewise, $V_2$ establishes a first threshold value for one condition of signal O and a second threshold value for a second condition of signal O.

Shown in FIGS. 3a–3b is a detailed schematic diagram of one embodiment of the Acceleration Differentiator circuit 22 and the Deceleration Differentiator circuit 20 of FIG. 2. A positive DC regulated voltage V provides the power to energize the components of the differentiator circuits 20 and 22 and gate circuits 24 and 26, and preferably supplies approximately +8 volts.

The Deceleration Differentiator circuit 20 comprises a negative slope detector 100 which includes differentiator transistors T28 and T29. The differentiator amplifier transistor T28 has its collector connected to the V source line 90 via the load resistor R38, its base connected to the source line 90 via the base bias resistor R39, and its emitter coupled to the differentiator circuit 102. The differentiator amplifier transistor T29 has its collector connected to the base of differentiator amplifier transistor T28, its base connected to the emitter of differential amplifier transistor T28 with its emitter grounded.

The differentiator circuit 102 comprises differentiator capacitor C3 in series with resistor R37 which is coupled to the incoming signal G indicative of wheel speed which is to be differentiated. Interaction of circuits 100 and 102 provides the desired differentiation function. Thus, when the varying DC signal G is coupled to the Deceleration Differentiator circuit 20 it is differentiated to provide the output signal O which is coupled to the hysteresis circuit 104. Circuit 104 comprises a transistor T30' having an emitter coupled to circuit ground and having a collector resistively coupled to signal O. Filter capacitor C4 capacitively couples the output signal O to circuit ground. The base of transistor T30' is resistively coupled to a gating signal K'.

The Acceleration Differentiator circuit 22 comprises a differentiator circuit 112 having a differentiating capacitor C6 resistively coupled through resistor R48 to incoming signal H for the selective differentiation thereof. The circuit 22 further comprises a positive slope detector 110 including differentiating transistors T35, T36 and T37 to provide the acceleration signals J and P. The differentiating amplifier transistor T35 has its base connected to the base of the differentiating amplifier transistor T36 and its emitter resistively coupled to capacitor C6 in the differentiating circuit 112. The collector of transistor T35 provides output signal J and is preferably connected to an input terminal of the acceleration program oscillator circuit 28 in FIG. 1. The differentiator amplifier transistor T36 has its base connected to ground through base bias resistor R52 and to the collector of transistor T37 and has its emitter connected to the base of the differentiator amplifier transistor T37 through the limiting transistor R51.

Hysteresis circuit 114 comprises a first resistor R50 coupling the collector of transistor T36 to circuit ground and resistor R59 coupling the collector of T36 to the variable threshold acceleration gate circuit 26. Capacitor C7 is a high frequency filter to remove any undesirable ripple on the collector of transistor T36, which provides the output signal P.

The preferred mode of operation of the acceleration and deceleration circuits is best understood when viewing the exemplary waveforms depicted in FIG. 4. Referring to FIG. 3B and the acceleration differentiator circuit 22, input signal H to the differentiator 112 exhibits a first region of constant amplitude, a second region having a negative rate of change of amplitude, a third region having a positive rate of change of amplitude, and a fourth region having a constant amplitude or zero rate of change of amplitude. As shown by waveforms P and J, when input signal H has a zero rate of change as shown by regions 1 and 4, the differentiated signal is a constant, relatively low level. To provide this level, transistor T37 is normally conducting which generates a high voltage on the base of transistor T36, causing transistor T36 to be non-conductive. The collector of transistor T36 and accordingly, the signal derived therefrom, is low. It is understood that bias voltage $V_1$ supplied in FIG. 3B is a threshold voltage level as indicated by parenthesis and does not provide a constant bias voltage to the collector of transistor T36.

The negative rate of change of the second region of input signal H draws any stored charge from capacitor C6. This current is drawn from the base of transistor T37 causing it to remain in the conductive state and to provide the constant output value shown for output signal P. However, the positively sloped third region of signal H forces current through differentiating capacitor C6 into the base region of transistor T37, causing it to become non-conductive. As transistor T37 turns off, the voltages on the common bases of transistors T35 and T36 fall to a low value which forces transistors T35 and T36 to become conductive (to turn on). T35 and T36 then remove all the current flowing into capacitor C6, which forces the base of transistor T37 to stay at a constant value and accordingly T37 remains in a linear state. The current through C6 is proportional to the rate of change of input H(the derivative of input H) and one-half of the current flows through the collector of T35 and one-half flows from the collector of T36. The voltage level gate circuit Q is low, and the collector current from T36 divides between resistors R50 and R59 providing an increasing output voltage pulse P shown in FIG. 4. The voltage on the collector of T36 increases until it reaches the threshold level $V_1$. This level causes the voltage level of the gating signal Q to become high which forces all the collector current from T36 through resistor R50. The output voltage signal P increases more rapidly when $V_1$ has been reached to provide a more responsive waveform. Such increased amplitude causes any gate circuit coupled thereto to be driven "on" harder, such as the Variable Threshold Acceleration Gate circuit 26.

Referring now to FIG. 3A and the Deceleration Differentiator circuit 20, input signal G exhibits first, second, third and fourth regions similar to those of signal H. For the condition that signal G exhibits a zero rate of change, as shown in the first region, the output signal O remains at a constant, relatively high output level. The differentiator capacitor C3 effectively eliminates any DC component of the signal G. For this zero change condition, transistor T28 is conductive (on) and furnishes base current to transistor T29, and the transistor pair T28 and T29 are in a linear operational mode. The current through sensing resistor R38, the base current needed to keep T29 conductive, is negligible.

When input signal G exhibits a negative rate of change of amplitude, as in region 2 of FIG. 4, capacitor C3 discharges through resistor R37 and draws the base current from transistor T29 to drive it non-conductive (off). When T29 becomes non-conductive, the base of T28 becomes high, causing T28 to turn on. Transistor T28 and resistor R38 furnishes whatever current is trying to be removed through capacitor C3 and accordingly holds the base voltage of transistor T29 constant, keeping T29 in the linear mode. Thus, the current through R38 equals the current flowing out of differentiator capacitor C3, which current is proportional to the rate of change (derivative) of the input. Depending on the current through C3 (the current through R38) the voltage on the collector of T28 decreases as is shown in the second region for output waveform O in FIG. 4. When the output voltage of waveform O reaches threshold level $V_2$ supplied by the Variable Threshold Deceleration Gate circuit 24 of FIG. 4, a gating signal K' from gate circuit 24 drives transistor T30' in the hysteresis circuit into a heavily conducting state. Current is drawn through resistor R40 through T30', causing the output voltage O to decrease rapidly. Such an increase in the negative rate of change of the amplitude allows a gate circuit coupled to the signal, such as the Variable Threshold Deceleration Gate circuit 34, to be driven quickly into the desired change of state, a hysteresis effect.

When input signal G exhibits a positive rate of change as shown in the third region of FIG. 4, current is forced into the base of transistor T29 causing it to conduct more heavily, which forces the base voltage of T28 low. T28 is thus driven non-conductive, and the output voltage O is clamped to a constant relatively high voltage, which is substantially that of V.

As earlier indicated, output signals J, P and O derived mathematically from input signals G and H are advantageously utilized in the Vehicle Skid Control Braking system depicted in FIG. 1. However, it is to be understood that an input signal representing any condition may suitably be differentiated to provide an output signal advantageously exhibiting a selective increase of the rate of change during switching (a hysteresis effect) in the manner of this invention.

Although specific embodiments of this invention have been described herein in conjunction with acceleration and deceleration differentiator circuits, which are advantageously utilized in the vehicle skid control braking system, various circuit modifications will be apparent to those skilled in the art in providing the

What is claimed is:

1. In a vehicle skid control braking system of the type that selectively controls engagement and disengagement of the braking system of a vehicle in accordance with selected braking conditions, a differentiator circuit comprising in combination:

first signal means responsive to a first signal representing vehicle wheel speed for generating a second signal representing a first condition corresponding to rate of change of the vehicle wheel speed;

second signal means responsive to said second signal and selectively altering the amplitude of said second signal for selectively controlling said first signal means when said second signal reaches a first selected value of said first condition of the vehicle wheel speed; and third signal means responsive to said second signal for selectively generating a third signal to provide a gate signal to said second signal means and for providing said first selected value to said first signal means.

2. The vehicle skid control braking of claim 1 wherein said first signal means selectively generates a signal consisting of a selected constant value in response to a first rate of change of said first signal.

3. The vehicle skid control braking system of claim 2 wherein said signal consisting of a selected constant value is said second signal.

4. The vehicle skid control braking system of claim 3 wherein said first rate of change of said first signal is a negative rate of change.

5. The vehicle skid control braking system of claim 4 wherein said rate of change of the wheel speed is acceleration of the wheels of the vehicle and said first selected value is representative of wheel acceleration at a predetermined rate.

6. The vehicle skid control braking system of claim 3 wherein said rate of change is deceleration of the wheels of the vehicle and said first selected value is representative of wheel deceleration at a predetermined rate.

7. The vehicle skid control braking system of claim 3 wherein said first signal representing the wheel speed of the vehicle is a varying DC signal.

8. The vehicle skid control braking system of claim 7 wherein said first signal means comprises:

a. a differentiating amplifier having first, second and third transistors, said second and third transistors having commonly connected bases which are coupled to the collector of said first transistor, and the base of said first transistor resistively coupled to the emitters of said second and third transistors respectively, wherein the collector of said third transistor provides said second signal; and b. a differentiating capacitor coupling said first signal to said base of said first transistor.

9. The vehicle skid control braking system of claim 8 wherein said second signal means comprises a hysteresis circuit having first and second resistors connected to the collector of said second transistor to provide said third signal wherein said first resistor couples said collector of said second transistor to circuit ground and said second resistor couples said collector of said second transistor to said third signal means.

10. In a vehicle skid control braking system of the type that selectively controls engagement and disengagement of the braking system of a vehicle in accordance with selected braking conditions, a differentiator circuit comprising in combination:

first signal means responsive to a first signal representing vehicle wheel speed for generating a second signal representing a first condition of the vehicle wheel speed;

second signal means responsive to said second signal and selectively altering the amplitude of said second signal for selectively controlling said first signal means when said second signal reaches a first selected value of said first condition of the vehicle wheel speed;

third signal means responsive to a second condition of a third signal representing said wheel speed of the vehicle for generating a fourth signal representing a second condition of the vehicle wheel speed; and fourth signal means responsive to said fourth signal for selectively controlling said third signal means when said fourth signal reaches a second selected value representing a preselected rate of said second condition of the vehicle wheel speed.

11. The vehicle skid control braking system of claim 10 wherein:

a. said first signal means comprises a first differentiator means for differentiating said first signal coupled to a positive slope detector for detecting when said first signal exhibits a positive rate of change; and b. said third signal means comprises a second differentiator means for differentiating said third signal coupled to a negative slope detector for detecting when said third signal exhibits a negative rate of change.

12. The vehicle skid control braking system of claim 11 and further including fifth signal means responsive to said fourth signal for providing said second selected value and for selectively generating a fifth signal to provide a gate signal to said fourth signal means to initiate said controlling thereby of said third signal means.

13. The vehicle skid control braking system of claim 12 wherein said third signal means comprises a differentiating amplifier having first and second transistors with the base of the first transistor connected to the collector of the second transistor and the emitter of the first transistor connected to the base of the second transistor and further coupled to said third signal by a differentiating capacitor, the collector of said first transistor providing said fourth signal.

14. The vehicle skid control braking system of claim 13 wherein said fourth signal means comprises a third transistor having a collector resistively coupled to the collector of said first transistor of said differentiator amplifier comprising said third signal means and having a base resistively coupled to said fifth signal means.

* * * * *